US006799207B1

(12) United States Patent
Corl, Jr. et al.

(10) Patent No.: US 6,799,207 B1
(45) Date of Patent: Sep. 28, 2004

(54) METHOD AND SYSTEM FOR DOWNLOADING SOFTWARE MANAGED TREES IN A NETWORK PROCESSING SYSTEM

(75) Inventors: Everett Arthur Corl, Jr., Raleigh, NC (US); Anthony Matteo Gallo, Apex, NC (US); Seeta Hariharan, Raleigh, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,343

(22) Filed: Apr. 10, 2000

(51) Int. Cl.[7] .............................................. G06F 15/173
(52) U.S. Cl. ....................... 709/223; 709/226; 709/245; 717/173; 717/178
(58) Field of Search ................................ 709/223, 224, 709/217, 219, 225, 11, 29, 226, 245; 345/734, 735, 736; 717/176–178, 171–173

(56) References Cited

U.S. PATENT DOCUMENTS

| | | | | |
|---|---|---|---|---|
| 5,864,839 A | * | 1/1999 | Bourgoin ........................ 707/1 |
| 5,919,247 A | * | 7/1999 | Van Hoff et al. ............ 709/217 |
| 5,974,237 A | * | 10/1999 | Shurmer et al. ............. 709/224 |
| 6,256,618 B1 | * | 7/2001 | Spooner et al. ................ 706/13 |
| 6,263,360 B1 | * | 7/2001 | Arnold et al. ............... 709/203 |
| 6,321,259 B1 | * | 11/2001 | Ouellette et al. ............ 709/220 |
| 6,324,693 B1 | * | 11/2001 | Brodersen et al. ........... 717/177 |
| 6,332,154 B2 | * | 12/2001 | Beck et al. .................. 709/204 |
| 6,460,120 B1 | * | 10/2002 | Bass et al. ................... 711/148 |
| 6,490,619 B1 | * | 12/2002 | Byrne et al. ................. 709/223 |
| 6,535,227 B1 | * | 3/2003 | Fox et al. .................... 345/736 |
| 6,574,729 B1 | * | 6/2003 | Fink et al. ...................... 713/1 |
| 6,584,499 B1 | * | 6/2003 | Jantz et al. .................. 709/220 |
| 6,647,508 B2 | * | 11/2003 | Zalewski et al. .............. 714/3 |
| 6,654,799 B1 | * | 11/2003 | Tanaka ........................ 709/223 |
| 6,654,830 B1 | * | 11/2003 | Taylor et al. .................. 710/74 |

FOREIGN PATENT DOCUMENTS

| | | |
|---|---|---|
| JP | 07-231330 | 8/1995 |
| JP | 11-317760 | 11/1999 |
| JP | 11-346216 | 12/1999 |

* cited by examiner

*Primary Examiner*—David Wiley
*Assistant Examiner*—Phuoc Nguyen
(74) *Attorney, Agent, or Firm*—Dillon & Yudell LLP

(57) ABSTRACT

A method and system for downloading software managed trees (SMTs) in a network processing system provides dynamic update of frame classifiers while maintaining proper network protocol processing. The network processing system includes a general purpose processor acting as control point processor and a plurality of network processors. The new SMT is built by an application on the control point processor and downloaded to one or more of the network processors. The new SMT is placed in a separate memory location accessible to the network processors, rather then overwriting the existing SMT. The active tree pointers are then changed to transfer control to the new SMT.

18 Claims, 4 Drawing Sheets

METHOD AND SYSTEM FOR DOWNLOADING SOFTWARE MANAGED TREES IN A NETWORK PROCESSING SYSTEM

BACKGROUND OF THE INVENTION

1. Technical Field

The present invention relates in general to computer networks, and in particular, to a network processor for managing network traffic that uses updateable software managed trees for processing frames without disrupting policy enforcement.

2. Description of the Related Art

Computer networks have evolved to a point where switch routers are insufficient to handle complex network a routing and filtering requirements. Network processors, such as the International Business Machines (IBM) Network Processor (NP) have been developed to fill this need. Utilizing a connection similar to that of a network switch, an NP provides a level of control and flexibility that surpasses that of the network switch. Parallel lookup operations can be performed on a frame, complex modifications can be performed on packets, and policies can be managed at complex levels. Multiple processors are used to achieve a very high frame processing throughput.

Instructions for managing frame routing in an NP, known as "picocode," reside in memory but are directly used by the hardware to efficiently process frames according to a fixed set of rules. The rules are entered by administration software and compiled into picocode that drives the logical engines for controlling frame routing, frame filtering and Quality of Service (QoS) requests.

Two types of classifier trees can be used to implement the frame processing commands: Software Managed Trees (SMTs) and Fixed Match Trees (FMTs). SMTs provide the capability of performing operations on ranges, while FMTs only apply to a specific values i.e.

Media Access Control (MAC) layer addresses. The advantage of SMTs is the support of range operations that are required to perform such functions as Internet Protcol (IP) sub-netting, the disadvantage is they cannot be easily updated on-the-fly. Since the SMT is compiled from a set of complex rules, it cannot be updated by changing a single leaf. The entire SMT needs to be recompiled and downloaded to a pico-processor. Therefore, the rules implemented in the SMT are typically static. As such, when it is necessary to change the rules in an SMT, the download process will be time consuming. During this time, the NP still must maintain proper protocol processing.

The present disclosure provides a method and system for updating SMTs so that protocol processing is not disrupted.

SUMMARY OF THE INVENTION

The objective of updating software managed trees (SMTs) so that protocol processing is not disrupted is achieved in a method and system for updating an existing frame classifier tree within a network processing system that includes plurality of network processors and at least one control point processor. The method builds a classifier tree on the control point processor, specifies a subset of network processors as download targets for the classifier tree, downloads the classifier tree to the subset of network processors, and transfers control of frame processing to the classifier tree from the existing frame classifier tree by changing active tree pointers within the subset of network processors.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
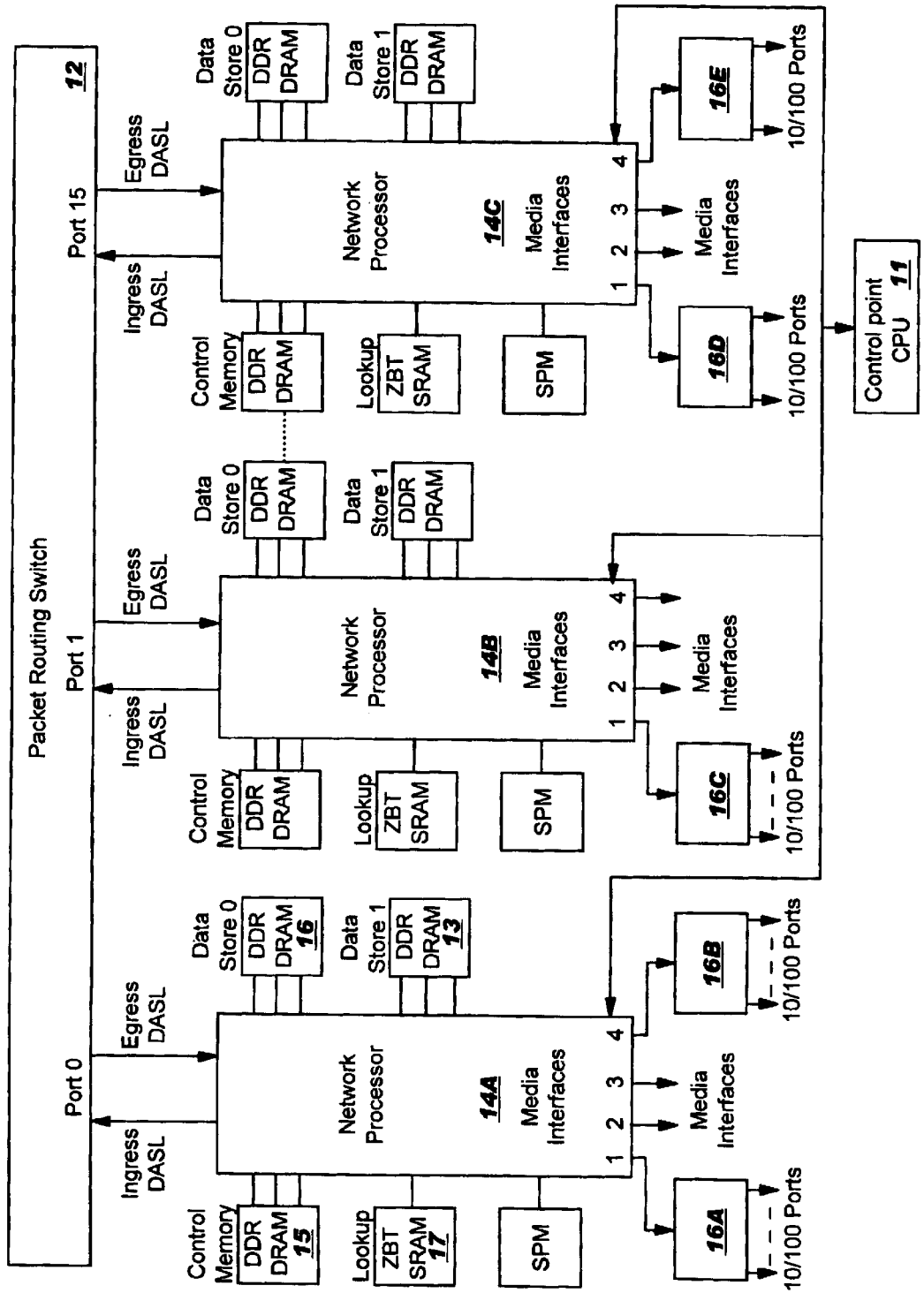
FIG. 1 is a block diagram of a network processor managed network subsystem in accordance with an embodiment of the present invention.

With reference to the figures, and in particular to FIG. 1, a network processing system in accordance with an embodiment of the present invention is depicted. A packet routing switch 12 is coupled to a group of network processors (NPs) 14A–14C. Each of NPs 14A–14C provides a media interface for connecting to networks having various protocols, such as 10 base-T or 100 base-T ethernet connections 16A–16E or other types of communication interfaces that are known in the art. Thus, NP 14A may route frames received at any of the media interfaces to port 0 on packet routing switch 12, and may perform address translations, respond to Quality-of-Service (QoS) requests, block packets, or perform any complex routing or frame processing function on the incoming frames. NP 14A via an Egress interface also receives frames from port 0 on packet routing switch 12 and may perform similar complex operations to route frames to the media interfaces. Control memory 15 provides storage for control software that drives the routing functionality and frame processing, and specifically the software managed tree (SMT) dynamic classifier of the present invention. A Lookup ZBT SRAM 17 provides fast access memory for storing the fixed match tree (FMT) hardware assisted matching of the present invention. A Control point (CP) central processing unit 11 provides management of network processor operations and downloading of applications, classifier trees and other data. The CPU 11 is also used to compile and create the SMTs for downloading. The trees are built by applications running on CPU 11, then downloaded to memory coupled to NPs 14A–14C.

Figure 2:
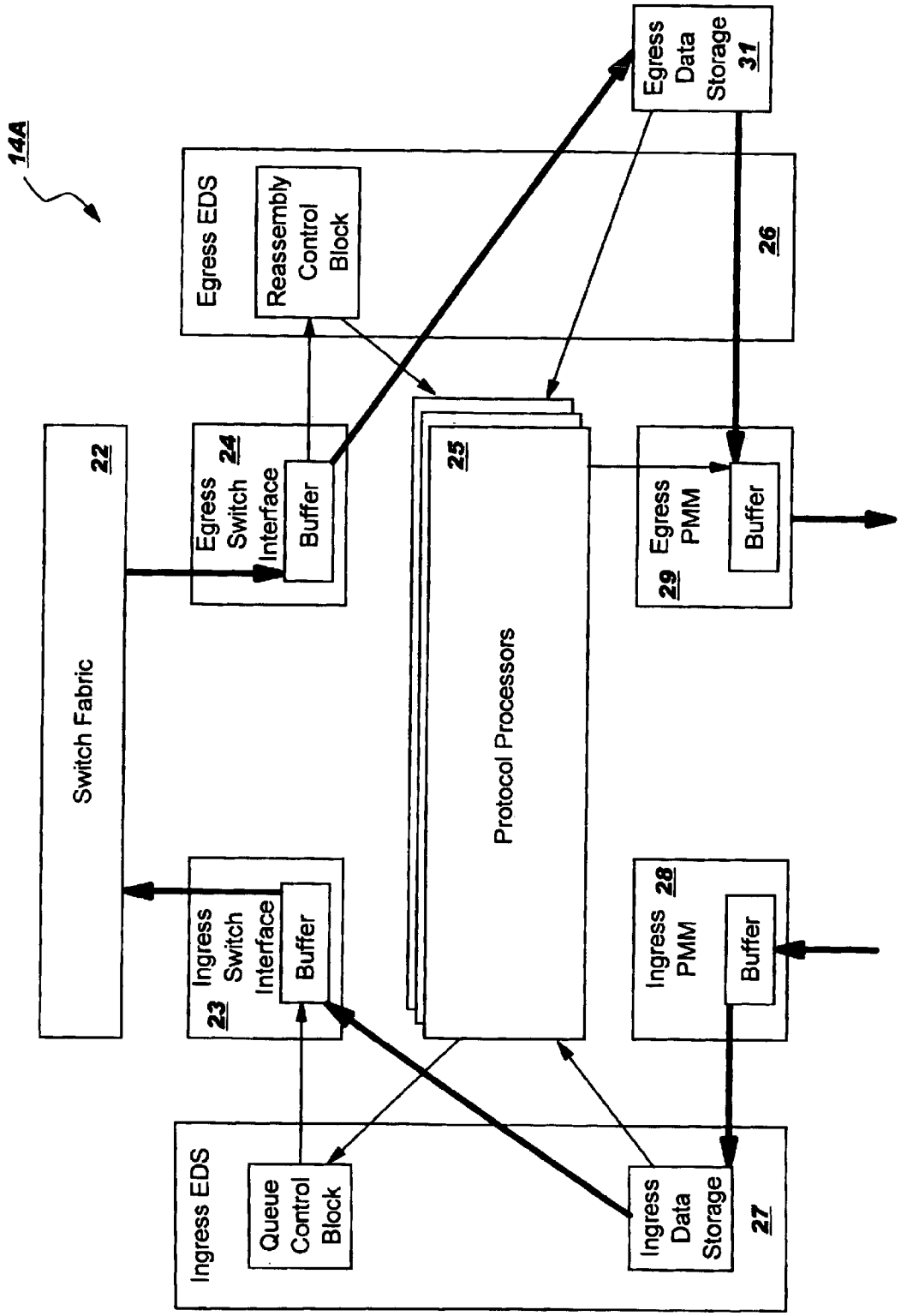
FIG. 2 is a simplified block diagram of frame flow in a network processor in accordance with an embodiment of the present invention.

Referring now to FIG. 2, a simplified block diagram of NP 14A is shown. An Ingress Enqueue/Dequeue/Scheduling logic (EDS) 27 manages frame buffering and control for frames routed to a switch fabric 22. Frames are received from the media interface connections by ingress physical MAC (Medium Access Control) multiplexer (PMM) 28, and are translated and processed by protocol processors 25. An ingress switch interface 23, provides a connection to switch fabric 22 and may connect to another NP or packet routing switch 12 (From FIG. 1). An egress switch interface 24 receives frame data from switch fabric 22 and the frame data is stored in an egress data storage 31. Protocol processors 25 then can perform classifier searches to process the frames and route them through an egress PMM 29.

Figure 3:
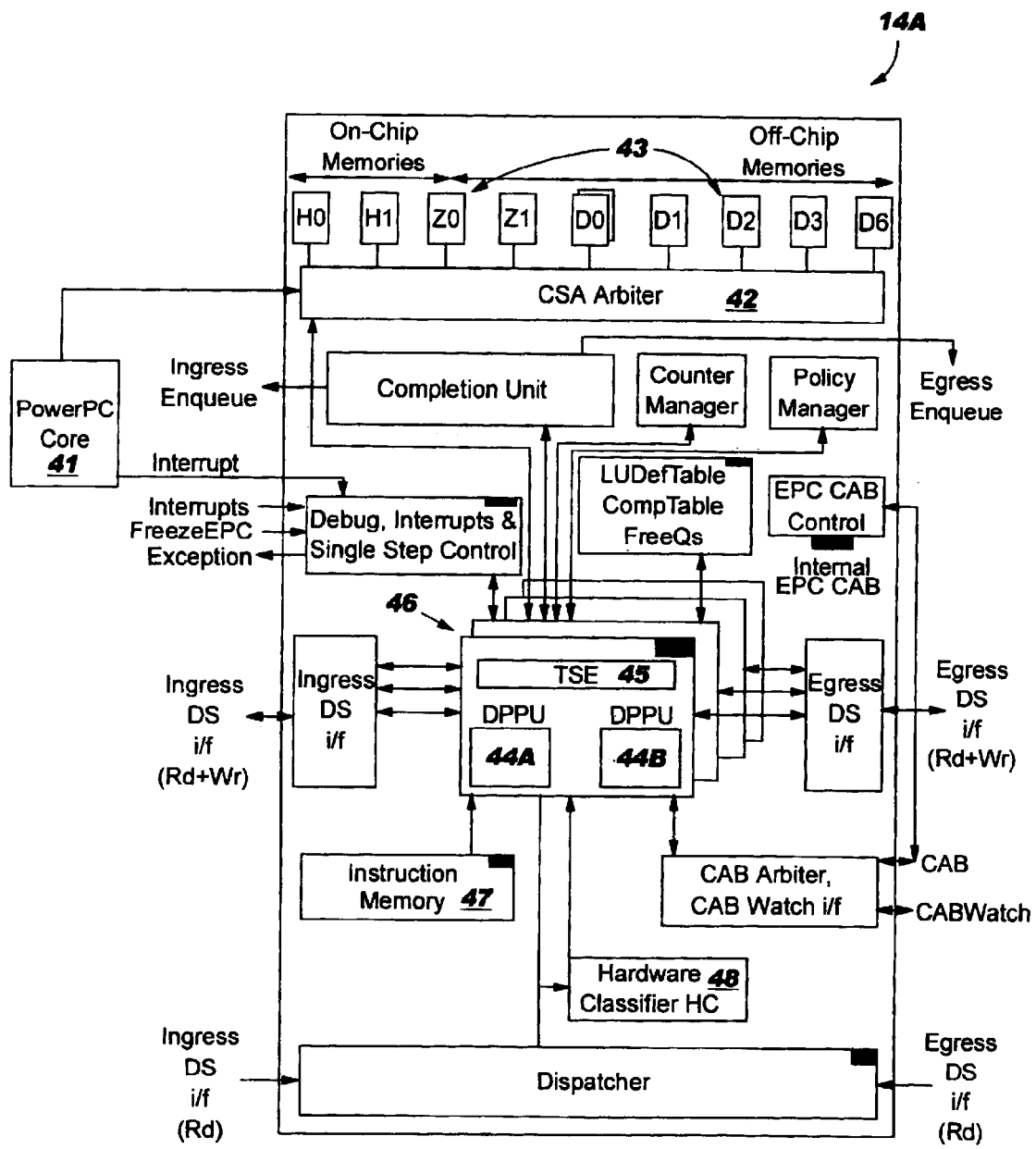
FIG. 3 is a detailed block diagram of a network processor in accordance with an embodiment of the present invention.

Referring now to FIG. 3, a detailed block diagram of a network processor unit 14A in accordance with a preferred embodiment of the invention is depicted. Memories 43 for storing the classifier trees are coupled to the NP by a control store arbiter 42, allowing core processing units 46 to share access to external and internal memory. Each core processing unit 46 contains dyadic protocol processing units (DPPU) 44A–44B and tree search engine 45. An instruction memory 47 is coupled to core processing unit 46 for storing the picocode that drives tree search engines 45 (TSEs). It is the tree search engine 45 operation to which the present invention pertains. A Power PC® core 41, provides management of the network processor unit 40. Software managed tree data and fixed match tree data may be downloaded into memories 43 provide control for TSEs 45 once a leaf in the tree is matched, it is loaded into internal registers in the network processor unit 40. The trees used with TSEs are referred to as static or dynamic trees. Dynamic trees are so called because they may be updated incrementally and quickly to produce changes in the processing of frames. Static trees are not incrementally upgraded and require a reload of the tree each time the tree is modified. Static trees are useful for providing more complex matching such as applying a leaf to a range of IP addresses. Hardware classifier 48 pre-processes received frames to prepare for matching.

The present invention embodies a method for downloading SMTs transparently to NPs 14A–14C, so that frame processing is not interrupted. A new classifier tree is built on CPU 11 and downloaded to one or more NPs 14A–14C. After the SMT framework is built as an empty list, elements are added and a token is returned for each addition. Further additions beneath each element require supplying the token, so that ownership of the tree is maintained and applications do not interfere with maintenance of the tree. Those skilled in the art will notice that the SMT is only the algorithm used to build the tree and that the invention relates to all tree building algorithms that are compiled and that cannot be updated easily on-the-fly.

Figure 4:
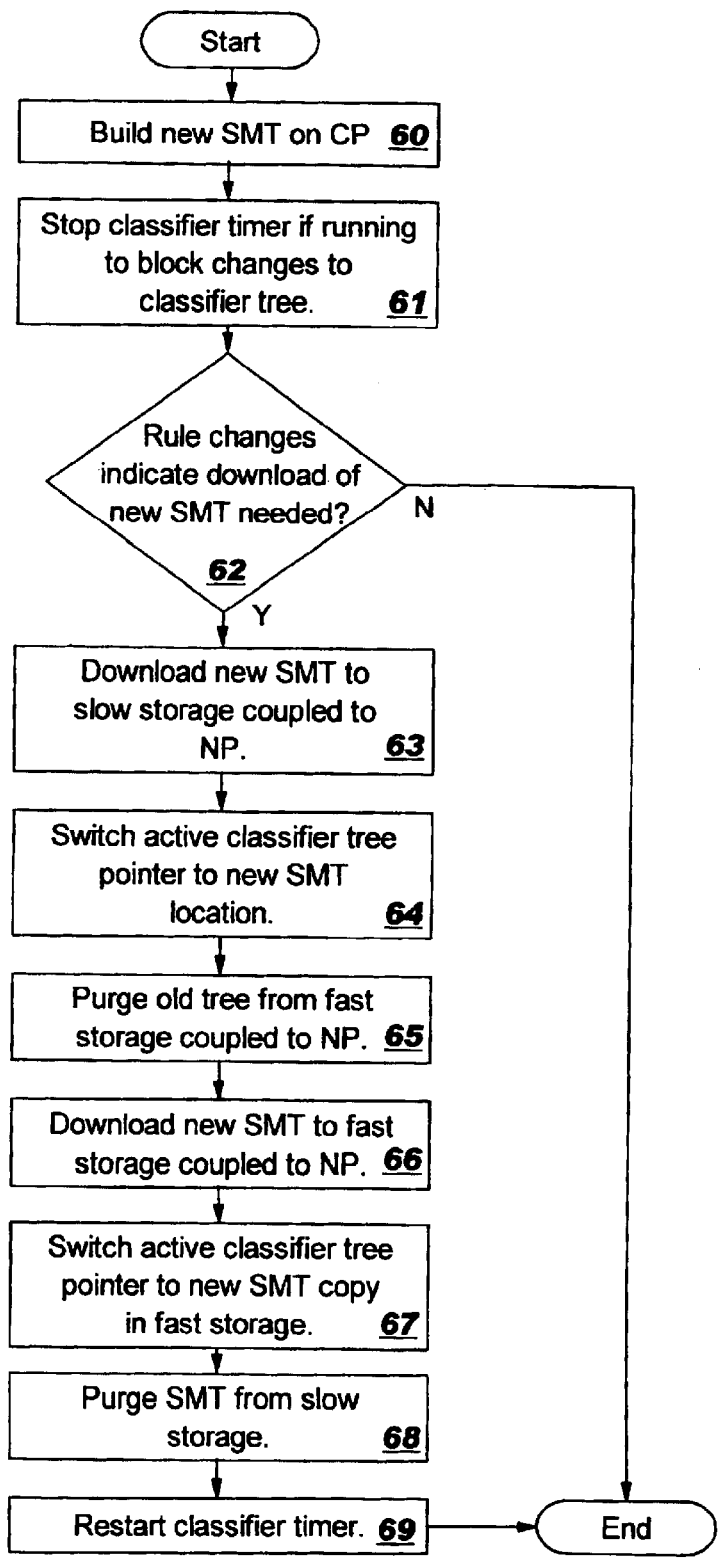
FIG. 4 is flowchart depicting a method for updating a frame classifier within a network processor managed network subsystem, in accordance with an embodiment of the present invention.

Referring now to FIG. 4, a method for downloading SMTs in accordance with a preferred embodiment of the invention is depicted. A new SMT is built on CPU 11 (step 60) and the classifier timer is stopped if it is already running (step 61). This prevents applications running on CPU 11 or NPs 14A–14C from making any additions or changes to the SMT while the download of a new SMT proceeds. The new SMT is checked to determine if rule changes have occurred (step 62). If not, the process ends, otherwise if the SMT needs to be downloaded (due to rule changes), it is generally first downloaded to slow storage (step 63), since fast storage is a limited resource and there may not be enough fast storage (either internal memory within NP 40 or external memory 43 such as ZBT SRAM 17). The pointer that specifies the location of the active SMT for the NP frame processor TSE 45 is changed to point at the newly downloaded SMT (step 64). Then, the old SMT is purged from fast memory (step 65). Another copy of the new SMT is downloaded to fast memory (step 66). Finally, the active classifier tree pointer is changed to point at the new SMT copy in fast memory (step 67), the SMT is purged from slow storage (step 68), and the classifier timer is restarted (step 69). This accomplishes an update of the SMT without halting operation of the TSE 45 while maximizing the size of available fast memory. If the SMT was not temporarily used from slow memory, then the fast memory would have to be larger to accommodate the old SMT and the new SMT, or the operation of TSE 45 would be interrupted while the download is being performed.

It is not necessary to perform the download twice to perform the method of the present invention. For example, SMT download may occur in a network processing system where all memory is accessible at the same speed. In this configuration, a single download is performed and the active pointer is switched to the new SMT location, since there would be no added benefit from recovering the location of the old SMT.

The hardware configuration of the memory addressing scheme may be used to enhance the operation of the present invention. The old SMT and the new SMT may be located in memory in such a way that the pointer change only requires complementing an address bit. For example, a pair of 32 K buffers could be used, where the change of pointer location from $0000_{hex}$ to $8000_{hex}$ will accomplish the change of active SMT. In this configuration, logic could be used to accomplish the SMT switching synchronously, providing a smooth transition from use of the old SMT to use of the new SMT.

While the invention has been particularly shown and described with reference to a preferred embodiment, it will be understood by those skilled in the art that various changes in form and detail may be made therein without departing from the spirit and scope of the invention.

What is claimed is:

1. A method for updating an existing frame classifier tree within a network processing system having a plurality of network processors, at least one control point processor, a first storage unit and a second storage unit, wherein said frame classifier tree is stored in a first location within said first storage unit, said method comprising:

building a classifier tree on said at least one control point processor;

specifying a subset of said plurality of network processors as download targets for said classifier tree;

downloading said classifier tree from said at least one control point processor to said subset of said plurality of network processors and to a second location within said second storage unit;

transferring control of frame processing to said classifier tree from an existing frame classifier tree by changing an active tree pointers from an address of said first location to an address of said second location within said subset of said plurality of network processors;

in response a completion of said control transfer, purging said classifier tree from said first storage unit;

downloading said classifier tree to said first location within said first storage unit; and changing said active tee pointer to said address of said first location.

2. The method of claim 1, wherein said method further includes excluding requests to build another classifier tree until said downloading has been completed, in response to said building.

3. The method of claim 1, wherein said method further includes:

determining whether or not an error condition exists on a particular one of said subset of said plurality of network processors during performance of said downloading; and in response to a determination that said error condition exists, discontinuing said downloading on said particular network processor, and continuing said downloading on a remainder of said subset of said plurality of network processors.

4. The method of claim 1, wherein said method further includes:

determining whether or not an error condition exists on a particular one of said subset of said plurality of network processors during performance of said downloading; and in response to a determination that said error condition exists, discontinuing performance of said downloading.

5. The method of claim 1, wherein said method further includes:

determining whether or not said classifier tree exists within at least one of said subset of said plurality of network processors; and in response to a determination that said classifier tree exists within at least one of said plurality of network processors, excluding said at least one network processor from said subset of said plurality of network processors.

6. The method of claim 1, wherein said network processing system includes an application program, and wherein said method further includes:

requesting addition of an element to said classifier tree, wherein said requesting is performed by said application program; and returning a token associated with said element to said application program.

7. The method of claim 6, wherein said method further includes preventing addition of another element beneath said element in said classifier tree unless said token is specified in said request.

8. The method of claim 1, wherein said network processing system includes a first storage unit and a second storage unit, and wherein said frame classifier is stored in a first location within said first storage unit, wherein said downloading downloads said classifier tree to a second location within said second storage unit, and wherein said transferring changes said active tree pointer from an address of said first location to an address of said second location.

9. The method of claim 1, wherein said first storage unit has an address range specified by a predetermined state of an address bit and said second storage unit has an address range specified by a complementary state of said address bit, wherein said transferring changes said active tree pointer by complementing said address bit within said pointer and said changing subsequently complements said address bit within said pointer to restore a value of said pointer to correspond to said first location.

10. A network processing system comprising:

at least one control point processor for building a classifier tree;

a plurality of network processors;

a first memory coupled to said at least one network processor, wherein a frame classifier tree is stored within a fist location;

a second memory coupled to said at least one network processor, wherein said control point processor downloads said classifier tree to a second location within said second memory, said at least one network processor changes said active tree pointer from an address of said first location to an address of said second location, wherein said at least one network processor purges said classifier tree from said first memory responsive to changing said active tree pointer, wherein said control point processor downloads said classifier tree to said first location within said first memory and said network processor changes said active tree pointer to an address of said first location after said classifier tree has been copied, and purging said classifier tree from said second memory;

means for specifying a subset of said plurality of network processors as download targets for said classifier tree;

means for downloading said classifier tree from said at least one control point processor to said subset of said plurality of network processors; and means for transferring control of frame processing to said classifier tree from an existing frame classifier tree by changing active tree pointers within said subset of said plurality of network processors.

11. The network processing system of claim 10, wherein said control point processor excludes requests to build another classifier tree until said transfer has been complete.

12. The network processing system of claim 10, wherein said control point processor determines whether or not an error condition exists on said at least one network processor during downloading, and wherein said control point processor discontinues said download in response to a determination that said error condition exists.

13. The network processing system of claim 12, wherein said control point processor determines that an error condition exists on a particular one of said plurality of network processors, and wherein said control point processor continues said download on all of said plurality of network processors except on said particular network processor for which said error condition exists.

14. The network processing system of claim 10, wherein said control point processor determines whether or not a classifier tree already exists within a particular processor from said at least one of said plurality of network processors, and excludes said particular network processor from said download.

15. The network processing system of claim 10, wherein said network processing system further includes:

means for requesting addition of an element to said classifier tree; and means for returning a token associated with said element to said application program.

16. The network processing system of claim 15, wherein said network processing system further includes means for preventing addition of another element beneath said element in said classifier tree unless said token is specified in a request.

17. The network processing system of claim 10, wherein said network processing system further includes:

a first memory coupled to said at least one processor, wherein said fame classifier tree is stored within a first location; and a second memory coupled to said at least one network processor, wherein said control point processor downloads said classifier tree to a second location within said second memory, and said at least one network processor changes said active tree pointer from an address of said first location to an address of said second location.

18. The network processing system of claim 10, wherein said first memory includes an address range specified by a state of an address bit and said second memory includes an address range specified by a complementary state of said address bit, wherein said at least one network processor changes said active tree pointer by complementing said address bit within said pointer and said changing means also complements said address bit within said pointer to restore a value of said pointer to correspond to said first location.

* * * * *